UNITED STATES PATENT OFFICE.

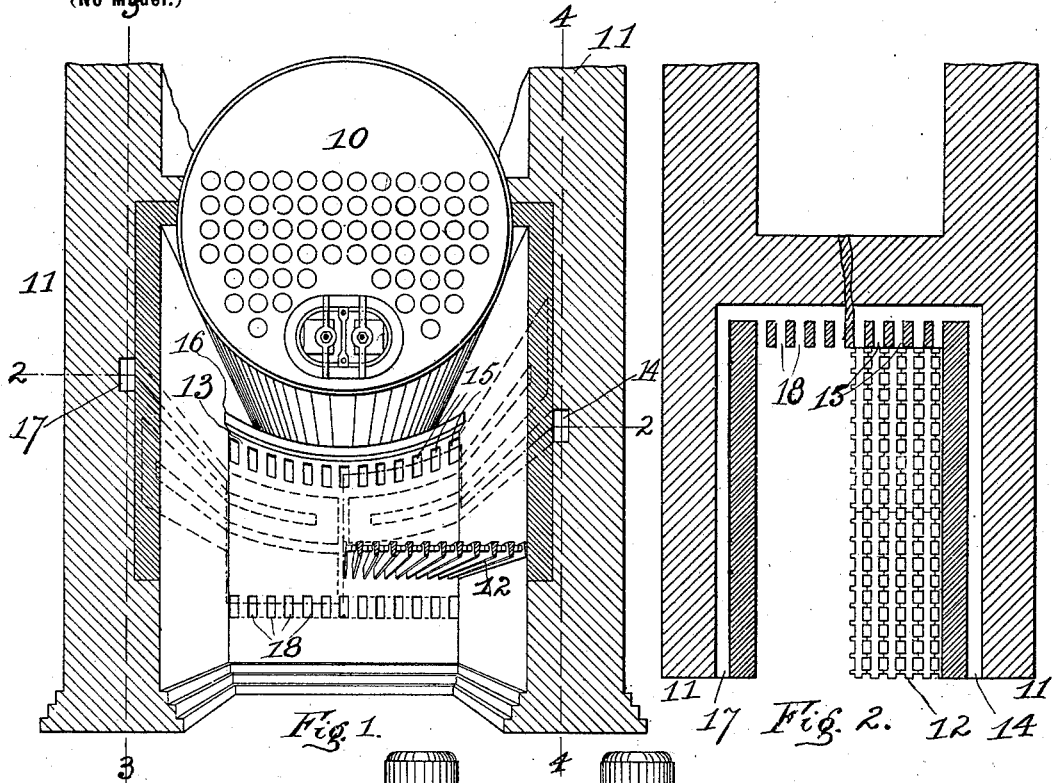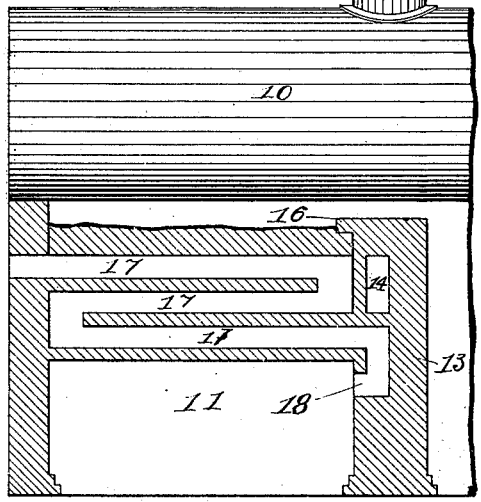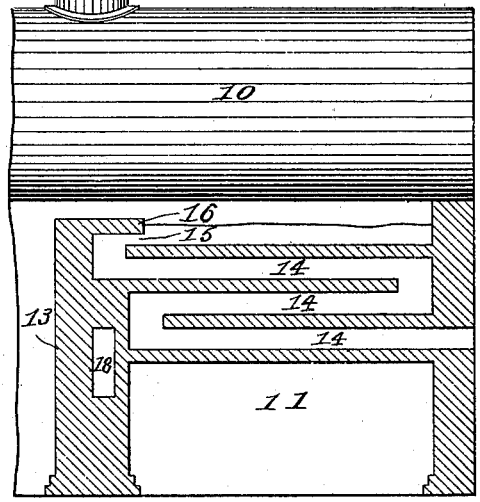

WILLIAM B. MORRIS AND GODFREY L. NORRMAN, OF ATLANTA, GEORGIA; JAMES BANKS ADMINISTRATOR OF SAID WILLIAM B. MORRIS, DECEASED.

SMOKE-CONSUMER.

SPECIFICATION forming part of Letters Patent No. 637,885, dated November 28, 1899.

Application filed March 21, 1898. Renewed October 24, 1899. Serial No. 734,680. (No model.)

*To all whom it may concern:*

Be it known that we, WILLIAM B. MORRIS and GODFREY L. NORRMAN, citizens of the United States, and residents of Atlanta, in the county of Fulton and State of Georgia, have made a certain new and useful Improvement in Smoke-Consumers; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to devices for causing a better combustion in furnaces, whereby a greater intensity of heat is obtained and the smoke and other inflammable products incidental to combustion are consumed, the object being such as is usual in this class of invention and the invention consisting of the device hereinafter specified and claimed.

The invention is shown in the accompanying drawings, in which—

Figure 1 is a perspective view of the interior of the fire-box of a boiler, the front being removed for the purpose of showing the interior. Fig. 2 is a horizontal section on the line of the lower openings into the fire-box on one side and the upper openings on the other side, the section being on the line 2 2, Fig. 1. Figs. 3 and 4 are vertical sections on lines 3 3 and 4 4, respectively, Fig. 1.

In the figures like reference characters are uniformly employed in the designation of corresponding elements of construction.

10 is the boiler, and 11 the side wall of the fire-box.

12 is the grate; 13, the bridge-wall.

Obviously this invention may be applied to any form of furnace, a boiler being shown merely for convenience.

14 is a flue which lies within the side wall 11 of the fire-box and passes just within the inner side of the said wall into and approximately half-way across the bridge-wall 13, whence it turns parallel to itself, passing along the bridge-wall 13 and the side wall 11 to a point near the front, where it again turns and passes parallel to itself along the side wall 11 and across the bridge-wall 13, opening out above the grate-bars near the top of said bridge-wall into a number of openings 15. These openings are placed under the overhanging ledge 16. The heated air in passing around the ledge 16 will produce an eddy and will produce combustion in whatever carboniferous matter passes over the bridge-wall 16 and does produce a perfect combustion.

17 is a flue like the flue 14 and following it in shape, except that it is inverted, the opening being slightly higher in the wall than that of the flue 14 and passing downwardly in parallel convolutions, the last convolution of this flue to extend below the grate-bars, where openings 18 permit the heated air to enter under the grate-bars and pass up through the grate and support combustion in the combustion-chamber proper or "fire-box" as it is ordinarily called. There may be a multiplicity of these flues, the number being regulated by the size of the furnace, the draft required or obtainable, and other circumstances.

It is obvious that the air passing through the wall 11 and the bridge-wall 13 by way of the flues 14 and 16 will be heated to a very high temperature, and thus will readily produce complete combustion in the combustion-chamber.

Having thus described our invention, what we claim as new, and desire to secure by Letters Patent of the United States, is—

1. In a smoke-consumer, a convoluted flue lying in one side wall and substantially half-way across the bridge-wall of a furnace, said flue opening at one end into the atmosphere, and its other end being extended across the bridge-wall, and opening through a multiplicity of ports into said furnace, for the purpose specified.

2. In a smoke-consumer, a convoluted flue lying in one side wall, and substantially half-way across the bridge-wall of the furnace above the grate-bars, said flue opening at one end into the atmosphere, and the other end being extended across the bridge-wall and opening through a multiplicity of ports into said furnace for the purpose specified.

3. In a smoke-consumer, two convoluted flues, both lying above the grate-bars in each side wall of the furnace, and extending into and substantially half-way across the bridge-wall, one of said flues opening into the atmosphere near the top of the combustion-chamber, and extending in one side-wall bridge-wall downwardly in convolutions; the bridge-wall portion of its last convolution extending substantially across the bridge-wall and opening into the furnace below the grate-bars through a series of openings, and the other of said flues opening at one end into the atmosphere lower down than the one previously mentioned, and extending in convolutions upwardly; the bridge-wall portion of the last convolution extending substantially across the bridge-wall and opening into the furnace above said grate-bar through a multiplicity of openings in said bridge-wall, for the purposes specified.

4. In a smoke-consumer, a convoluted flue lying in one side wall and substantially half-way across the bridge-wall of the furnace, said flue opening at one end into the atmosphere, and being extended across the bridge-wall, its other end opening through a multiplicity of ports into said furnace above the grate-bars and an inwardly-projecting flange on top of the bridge-wall of said furnace, above said ports, for the purpose specified.

5. In a smoke-consumer, flues lying within the side walls of a furnace and extending into and along the bridge-wall, so as to occupy each substantially one-half of said bridge-wall, said flues opening at one end into the furnace respectively above and below the grate, and the other end of each flue opening into the atmosphere, for the purposes specified.

In testimony whereof we hereunto affix our signatures in presence of two witnesses.

WILLIAM B. MORRIS.
GODFREY L. NORRMAN.

Witnesses:
A. P. WOOD,
S. M. WOOD.